(12) United States Patent
Chen et al.

(10) Patent No.: US 7,779,464 B2
(45) Date of Patent: Aug. 17, 2010

(54) SYSTEM SECURITY APPROACHES UTILIZING A HIERARCHICAL MEMORY SYSTEM

(75) Inventors: Meng-Hong Chen, Hsinchu County (TW); Shih-Wei Chien, Hsin-Chu (TW); Shi-Ming Zhao, Taipei (TW)

(73) Assignee: Lionic Corporation, Hsinchu (TW)

( * ) Notice: Subject to any disclaimer, the term of this patent is extended or adjusted under 35 U.S.C. 154(b) by 1241 days.

(21) Appl. No.: 11/307,105

(22) Filed: Jan. 24, 2006

(65) Prior Publication Data

US 2006/0224828 A1 Oct. 5, 2006

Related U.S. Application Data

(63) Continuation-in-part of application No. 10/868,665, filed on Jun. 14, 2004.

(51) Int. Cl.
*G06F 11/00* (2006.01)
(52) U.S. Cl. .......................................... 726/22; 726/23
(58) Field of Classification Search ................. 711/117, 711/100, 105, 111–112, 122; 726/1, 22–26, 726/11; 713/165–166, 187–188
See application file for complete search history.

(56) References Cited

U.S. PATENT DOCUMENTS

| | | | |
|---|---|---|---|
| 5,982,891 A * | 11/1999 | Ginter et al. | ................... 705/54 |
| 6,487,666 B1 | 11/2002 | Shanklin | |
| 6,490,669 B1 | 12/2002 | Yabe | |
| 6,598,034 B1 | 7/2003 | Kloth | |
| 6,609,205 B1 | 8/2003 | Bernhard | |
| 6,792,546 B1 | 9/2004 | Shanklin et al. | |
| 6,880,087 B1 | 4/2005 | Carter | |
| 7,180,895 B2 | 2/2007 | Smith | |
| 7,185,081 B1 | 2/2007 | Liao | |
| 7,308,715 B2 * | 12/2007 | Gupta et al. | ................... 726/23 |
| 7,596,809 B2 | 9/2009 | Chien | |
| 2002/0073298 A1 | 6/2002 | Geiger et al. | |
| 2002/0124187 A1 | 9/2002 | Lyle | |

(Continued)

FOREIGN PATENT DOCUMENTS

GB     2 417 655 A    3/2006

OTHER PUBLICATIONS

"IDT™ Network Search Engine.", pp. 1-4, USA.

(Continued)

*Primary Examiner*—Hosuk Song
(74) *Attorney, Agent, or Firm*—Winston Hsu

(57) ABSTRACT

A method and system for ensuring system security is disclosed. Based on the content of the data units the method and system monitor, the method and system retrieve the states and the dependency relationships among these states that are representative of unwanted patterns. The method and system store the states and the dependency relationships mentioned above in different types of memories according to the frequency of accessing the states. The frequency is calculated by comparing a number of test data patterns with the states in a sequence specified by the dependency relationships. The method and system further identify a set of suspected data units by comparing the data units with the retrieved states in a sequence specified by the retrieved dependency relationships, wherein the content of the set of the suspected data units collectively matches any of the unwanted patterns.

28 Claims, 10 Drawing Sheets

U.S. PATENT DOCUMENTS

| | | | |
|---|---|---|---|
| 2002/0129140 | A1 | 9/2002 | Peled |
| 2002/0171566 | A1 | 11/2002 | Huang |
| 2003/0004689 | A1 | 1/2003 | Gupta |
| 2003/0051043 | A1 | 3/2003 | Wyschogrod |
| 2003/0123447 | A1 | 7/2003 | Smith |
| 2003/0131216 | A1 | 7/2003 | Henkel et al. |
| 2003/0221013 | A1 | 11/2003 | Lockwood |
| 2004/0105298 | A1* | 6/2004 | Symes .................. 365/149 |
| 2005/0055399 | A1 | 3/2005 | Savchuk |
| 2005/0172337 | A1 | 8/2005 | Bodorin |
| 2005/0278781 | A1 | 12/2005 | Zhao |
| 2006/0005241 | A1 | 1/2006 | Zhao |
| 2006/0053180 | A1 | 3/2006 | Alon |
| 2007/0006300 | A1 | 1/2007 | Zamir |

OTHER PUBLICATIONS

"NodalCore-X Security Processing Unit.", The ultra-high speed security processor powering next generation security products . . . , http://www.sensorynetworks.com/Products/NodalCore-X-Security-Processing-Unit/?PHPSESSID=46047f200abf....

"Patent Survey.", pp. 1-4.

"SafeXcel-4850 General Purpose Content Inspection Engine."

James Moscola, et al, "Implementation of a Content-Scanning Module for an Internet Firewall", Field-Progammable Custom Computing Machines, FCCM 2003. Proceedings the 11th Annual IEEE Symposium on Apr. 9-11, 2003, Piscataway, NJ, USA, IEEE. XP010655273; ISBN 0-7695-1979-2.

Allo. Sethi. Ullman, "Compilers", 1986, Sec 3.7, p. 121-128. XP002381613.

C. Scott Ananian. "JLex: A Lexical Analyzer Generator for Java(TM)", version 1.2.6, Feb. 7, 2003 p. 1-2, Internet. XP002382680.

Reetinder Sidhu, et al, "Fast Regular Expression Matching using FPGAs" Field-Programmable Custom Computing Machines, 2001, FCCM'01. The 9th annual IEEE Symposium on rohert park. CA, USA, Apr. 29, 2001, paragraph 02.4. XP010789123; ISBN 0-7695-2667-5.

Christopher R. Clark et al, "A pattern-matching co-processor for network instrusion detection systems" Field-Programmable Technology (FPT), Proceedings 2003 IEEE International Conference on Dec. 15-17, 2003, Piscataway, NJ, USA, IEEE, pp. 68-74. XP010688321; ISBN 0-7803-8320-6.

Elliot Berk, JLex:A lexical analyzer generator for Java(TM), Sep. 6, 2000, http://www.cs.pitt.edu/~mock/cs2210/handouts/jlex-manuel.pdf.

* cited by examiner

SYSTEM SECURITY APPROACHES UTILIZING A HIERARCHICAL MEMORY SYSTEM

CROSS REFERENCE

This application is a continuation-in-part of U.S. application Ser. No. 10/868,665 filed on Jun. 14, 2004, which is incorporated herein by reference in its entirety.

FIELD

This patent document generally relates to system security approaches, especially methods and systems utilizing a hierarchical memory system that provides preventive measures in response to attacks to a device on a network.

BACKGROUND

Unless otherwise indicated herein, the approaches described in this section are not prior art to the claims in this application and are not admitted to be prior art by inclusion in this section.

As computer networks become ubiquitous, any device that is connected to the networks is susceptible to debilitating attacks, such as viruses, worms, and cracker attacks. Typical approaches to counter these attacks include firewall techniques and anti-virus programs. Firewalls generally prevent certain types of files or packets from entering a network, and anti-virus programs typically prevent files that contain virus patterns from being executed on a device or a group of devices.

Several types of firewall techniques exist today. Some examples include packet filter, application gateway, and proxy server. The packet filter approach inspects the control information of each packet and determines whether to accept or reject the packet based on user-defined rules. The application gateway approach applies a security mechanism to certain applications, such as FTP and Telnet servers. The proxy server approach utilizes an in-between server to intercept and inspect packets between a client application and a server on a network to which the client application submits requests to. None of these existing techniques inspects the payload data portion of each packet or handles malicious code segments that spread across packet boundaries.

An anti-virus program that executes on a device generally assembles incoming packets received by the device into a file before determining whether the assembled file includes certain predetermined virus patterns. In such approaches, no inspection takes place until after a file or a block of data has been assembled. For attacks that target real-time protocols, the timing requirements of the protocols would render the aforementioned assembling-before-scanning approaches essentially inoperable. Furthermore, even for the attempted approaches that inspect the content of the incoming packets without having assembled the packets first, the attempted approaches rely on memory systems with uncompetitive cost structures or undesirable performance characteristics.

DETAILED DESCRIPTION

Figure 1:
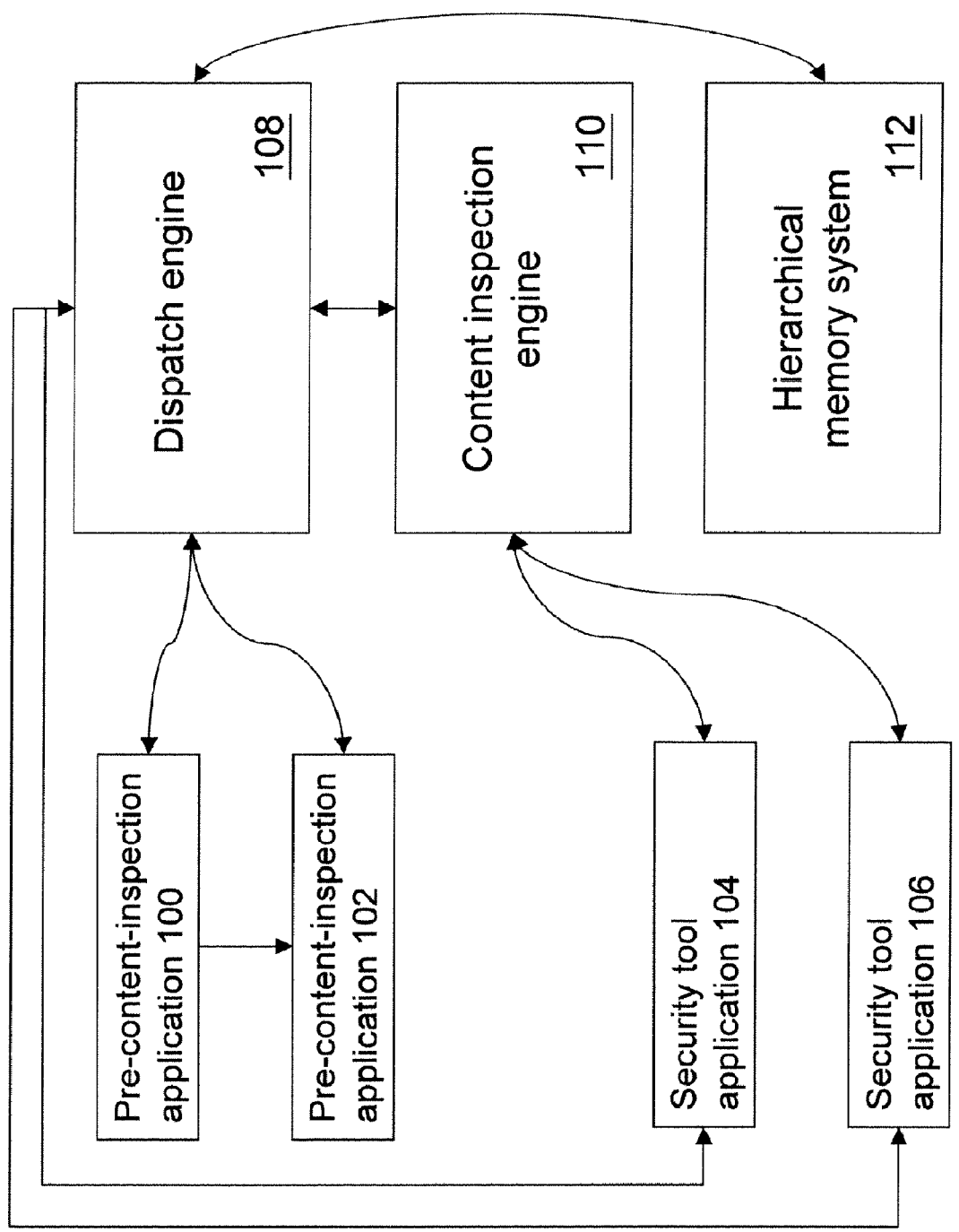
FIG. 1 is a block diagram of one embodiment of a system security approach.

System security approaches are described. In the following description, for the purposes of explanation, numerous specific details are set forth in order to provide a thorough understanding of the present invention. It will be apparent, however, to one skilled in the art that the present invention may be practiced without these specific details.

The general theories behind "regular expression," "state machine," and "automaton," are well known in the art and will not be elaborated in detail. However, throughout this disclosure, "state machine" is used interchangeably with "state automaton". "Wild card" generally refers to special symbols, such as a combination of the period and the asterisk (.*), that stand for zero, one, or more characters (e.g., ".*abc" refers to all patterns that end with "abc"). Each "data unit" generally refers to data that are stored in a particular memory location or a packet with a destination address. Each "processing element" generally refers to a combination of bits, such as, without limitation, a byte (8 bits), a 16-bit word, a 32-bit word, and a 64-bit word, of a data unit that a content inspection engine supports. An "application" generally refers to a program or a group of programs designed for a user of a terminal or a computer system.

1.0 General Overview

The system security approaches as discussed below include methods and systems that, based on the content of the data units they monitor, retrieve the states and the dependency relationships among these states, which are representative of unwanted patterns. The methods and systems store the states and the dependency relationships mentioned above in different types of memories according to the frequency of accessing the states. The frequency is calculated by comparing a number of test data patterns with the states in a sequence specified by the dependency relationships. The methods and systems further identify a set of suspected data units by comparing the data units with the retrieved states in a sequence specified by the retrieved dependency relationships, wherein the content of the set of the suspected data units collectively matches any of the unwanted patterns.

2.0 System Security Approaches

2.1 Overview

An overview of system security approaches is now provided. To "secure" a system, one approach is to examine data units that enter into and depart from the system to ensure that the system is freed from invasion of unwanted codes and unauthorized accesses. An "unwanted" or "undesirable" code or pattern is used throughout the disclosure from the perspective of the system to be secured or protected. The approach is based in part on the use of regular expressions, which generally refer to sets of symbols and syntactic elements used to represent certain patterns. For example, a simple regular expression, such as (a|b)t, represents the patterns "at" and "bt". Although a well-crafted regular expression may appear concise, especially with the use of wild cards, the expression may represent many patterns and result in a state machine with many states. A "definition data file" generally refers to a file containing a collection of regular expressions, which represent the patterns that have been identified to be undesirable or unwanted.

One system security approach is also based in part on managing and manipulating the states in various state automata that are derived from the regular expressions to effectively search and match certain patterns. As more and more unwanted patterns are identified, more and more states are needed to represent the unwanted patterns. A memory system utilized by the system security approach should cost effectively store and retrieve these ever growing number of states and their related information while still maintaining the high performance of the approach.

FIG. 1 is a block diagram of one embodiment of a system security approach. This embodiment includes at least the following functional blocks: 1) one or more pre-content-inspection applications, such as 100 and 102, 2) one or more security tool applications, such as 104 and 106, 3) dispatch engine 108, 4) content inspection engine 110, and 5) hierarchical memory system 112.

The security tool applications, such as 104 and 106, invoke a process of searching for and identifying unwanted patterns via dispatch engine 108 in the data units that they receive. The method and system of searching for and identifying such unwanted patterns are disclosed and claimed in the U.S. application Ser. No. 10/868,665 filed on Jun. 14, 2004.

On the other hand, the pre-content-inspection applications, such as 100 and 102, generate information for the initialization of the aforementioned search and identification process also via dispatch engine 108. More specifically, one embodiment of pre-content-inspection application 100 is a compiler, which generates various state automata according to the regular expressions that it receives from definition data file providers. Some examples of these providers include, without limitation, the developer of pre-content-inspection application 100 or companies like Kaspersky Lab, Symantec Corp., McAfee, Inc., and Trend Micro Inc. The method and system that the compiler employs to generate the state automata is disclosed and claimed in the U.S. application Ser. No. 10/868, 665 filed on Jun. 14, 2004.

One embodiment of pre-content-inspection application 102 is a pattern analysis tool. In particular, the pattern analysis tool obtains the state automata from pre-content-inspection application 100 and performs the process of searching for and identifying unwanted patterns mentioned above in a number of data test patterns. The data test patterns simulate many types of data traffic. Some examples include, without limitation, data traffic with random patterns, data traffic that has been infected with the known unwanted patterns, data traffic in email communications, web browsing sessions, multimedia streaming, and online game sessions. In addition to performing the process, the pattern analysis tool monitors and records the performance, especially tracking the states in the state automata that have been accessed and the number of times such states have been accessed.

Figure 2:
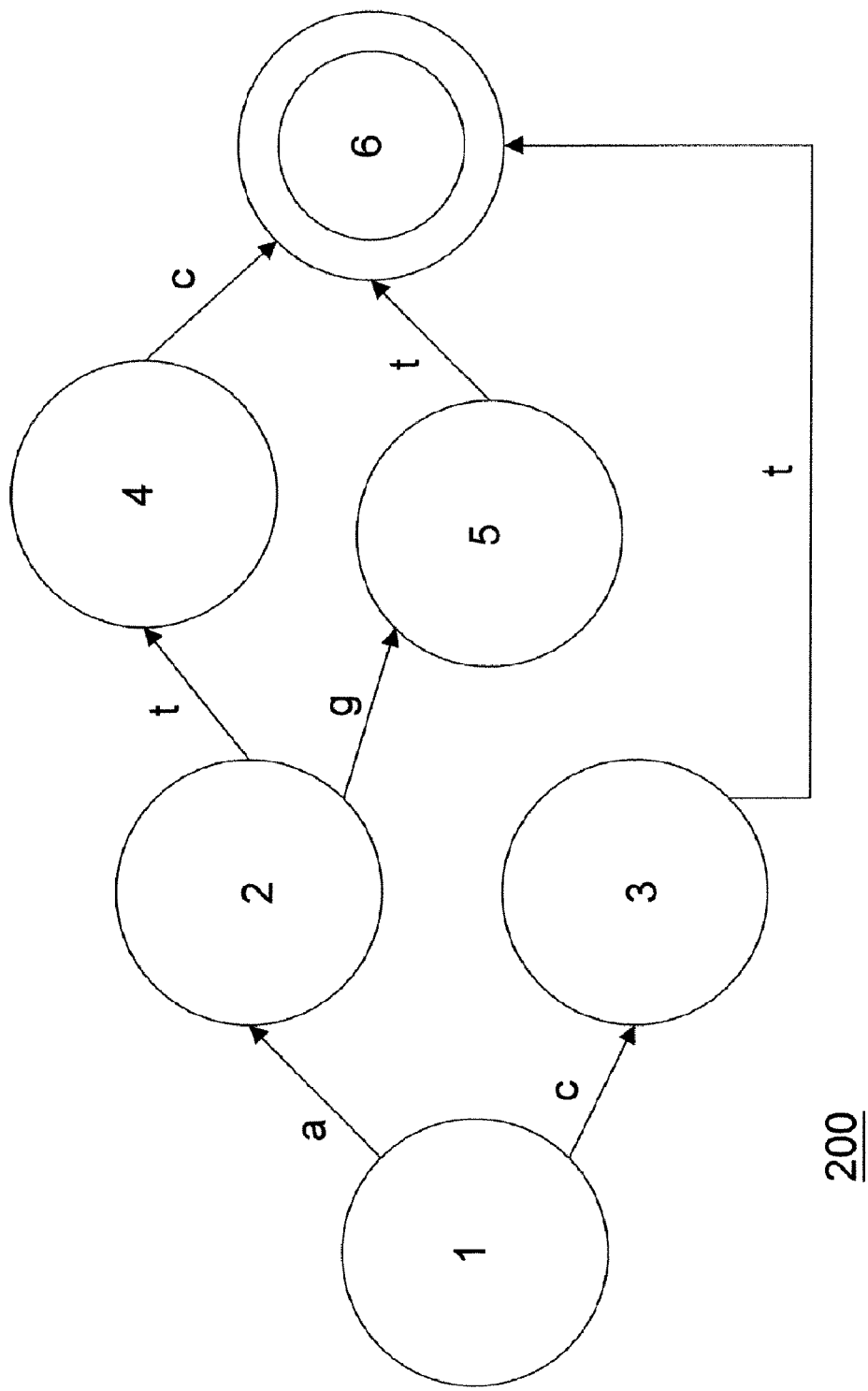
FIG. 2 illustrates a state automaton.

A simple state automaton is shown in FIG. 2 to demonstrate how the pattern analysis tool tracks the states as discussed above. More particularly, FIG. 2 is a state transition diagram that illustrates one state automaton 200. The regular expression of state automaton 200 is (a(tc|gt))|(ct)). State automaton 200 has $\{1, 2, 3, 4, 5, 6\}$ as its states, $\{a, c, t, g\}$ as its input characters, $\{1\}$ as the initial state, and $\{6\}$ as the final state. State automaton 200 also has a transition function, where $\delta$(initial state, input character)=next state. More specifically, $\delta(1, a)=2, \delta(2, t)=4, \delta(4, c)=6, \delta(2, g)=5, \delta(5, t)=6, \delta(1, c)=3$, and $\delta(3, t)=6$. The patterns that are represented by state automaton 200 are $\{ct, atc, agt\}$.

Suppose the data test pattern is $\{axyzctmctnatc\}$ and suppose state 1 is accessed when the input character is not recognized by state automaton 200. Then, by putting this data test pattern through state automaton 200, one embodiment of pre-content-inspection application 102 records at least the following information: 1) the states that have been accessed, such as states 1, 2, 3, 4, and 6 are accessed; and 2) the number of times each state is accessed (e.g., state 1 is accessed six times, state 2 two times, state 3 two times, state 4 one time, and state 6 three times). After having put a number of data test patterns through the various state automata, which pre-content-inspection application 100 generates, and having analyzed the recorded information as shown above, pre-content-inspection application 102 determines statistically the frequency of the states that are accessed (the "state hit ratio").

In addition to the state hit ratio information, one embodiment of pre-content-inspection application 102 also has access to certain information regarding hierarchical memory system 112, such as the number of memory tiers and their respectively virtual address ranges. Based on the state hit ratio, pre-content-inspection application 102 designates different parts of the state automata to be stored in different memory tiers in hierarchical memory system 112. In one implementation, pre-content-inspection application 102 places the information relating to the state automata, the size of such information, and the virtual addresses to the memory tier to store such information in data units and send the data units to dispatch engine 108.

Using the state automaton shown in FIG. 2 and discussed above as an illustration, suppose hierarchical memory system 112 has three memory tiers. The memory tier with the fastest memory access time among the three tiers occupies the virtual address spectrum between 0x0000 and 0xffff; the memory tier with the second fastest memory access time occupies the virtual address spectrum between 0x10000 and 0xfffff; and the memory tier with the slowest memory access time occupies virtual addresses above 0x100000. One embodiment of pre-content-inspection application 102 may decide that the information relating to states 1 and 6 (e.g., the information representative of the states themselves and also the transition functions of the states) should be placed in the memory tier with the fastest memory access time; states 2 and 3 should be placed in the memory tier with the second fastest memory access time; and state 4 should be placed in the memory tier with the slowest memory access time. Instead specifying the exact physical memory addresses, pre-content-inspection application 102 places the information representative of the states 1, 2, 3, 4, and 6 and also their respective transition functions, the size of such information, and the virtual addresses representative of the available memory locations in the different memory tiers in the data units to be sent to dispatch engine 108.

Moreover, one embodiment of pre-content-inspection application 102 has access to the compression and decompression (or otherwise abbreviated to be "de/compression")

methods that are supported by dispatch engine 108 and hierarchical memory system 112. Each one of the supported de/compression methods compresses the data to be stored in or decompresses the data to be retrieved from each of the memory tiers in hierarchical memory system 112. One de/compression method involves the de/compression of the dependency relationships among the states in the state automata. In addition, each compression method may yield a different compression ratio. "Compression ratio" refers to the ratio between the size of the uncompressed data and the size of the compressed data. Thus, a compression ratio of 3:1 means the size of the compressed data is ⅓ of the size of the uncompressed data. Based on any or a combination of a number of factors, which include, without limitation, the size of the data to be placed in a particular memory tier, the size of each memory tier, the speed of the compression engine, and the characteristics of the data to be compressed, pre-content-inspection application 102 selects one of the supported de/compression methods and places the selection in the data units to be sent to dispatch engine 108.

2.2. One Embodiment of a Hierarchical Memory System

Figure 3:
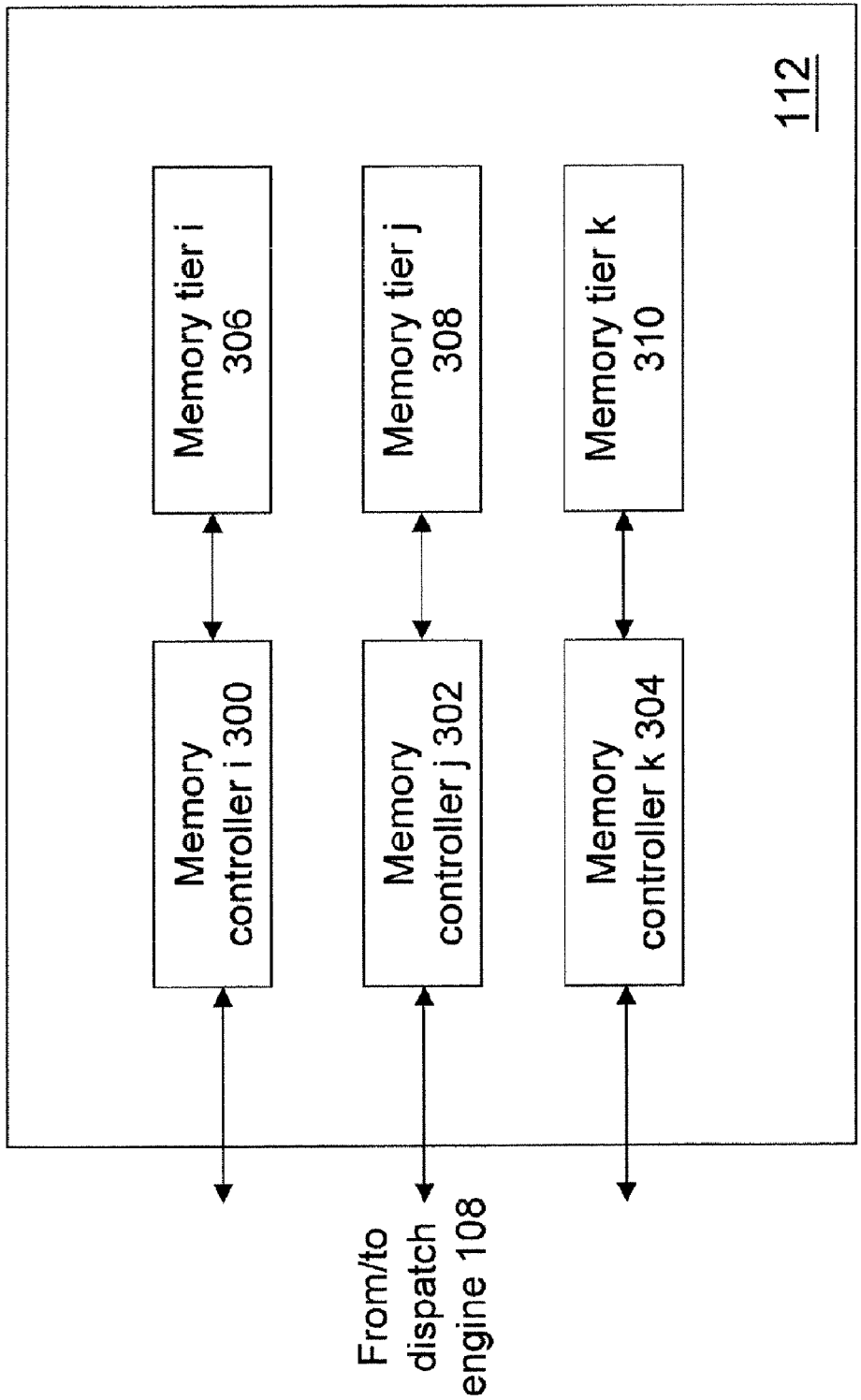
FIG. 3 is a block diagram of one embodiment of a hierarchical memory system.

FIG. 3 is a block diagram of one embodiment of a hierarchical memory system, such as hierarchical memory system 112 as shown in FIG. 1. Specifically, the hierarchical memory system includes a number of memory controllers, such as i 300, j 302, and k 304, and different types of memories that correspond to the memory controllers, such as memory tiers i 306, j 308, and k 310. In one embodiment, each memory tier consists of a memory type with distinct pricing and performance characteristics. For example, among memory tiers i 306, j 308, and k 310, memory tier i 306 refers to the type of memory with the fastest access time out of the three memory tiers; memory tier j 308 refers to the type of memory with a slower access time than the memory tier i 306; and memory tier k 310 refers to the type of memory with the slowest access time among the three memory tiers.

Moreover, in this embodiment, memory tiers i 306, j 308, and k 310 are standard memory parts. For instance, memory tier i 306 consists of Static Random Access Memory ("SRAM"); memory tier j 308 consists of Synchronous SRAM ("SSRAM"); memory tier k 310 consists of Reduced Latency Dynamic Random Access Memory ("RLDRAM") or Synchronous DRAM ("SDRAM"). Furthermore, the I/O interfaces between these different memory tiers and memory controllers are conventional interfaces, such as SRAM interface, SSRAM interface, RLDRAM interface, and SDRAM interface. Although multiple memory controllers are shown in FIG. 3, it should be apparent to a person of ordinary skill in the art to use a single memory controller supporting multiple I/O interfaces to manage the different memory tiers.

2.3. One Embodiment of a Dispatch Engine

Figure 4:
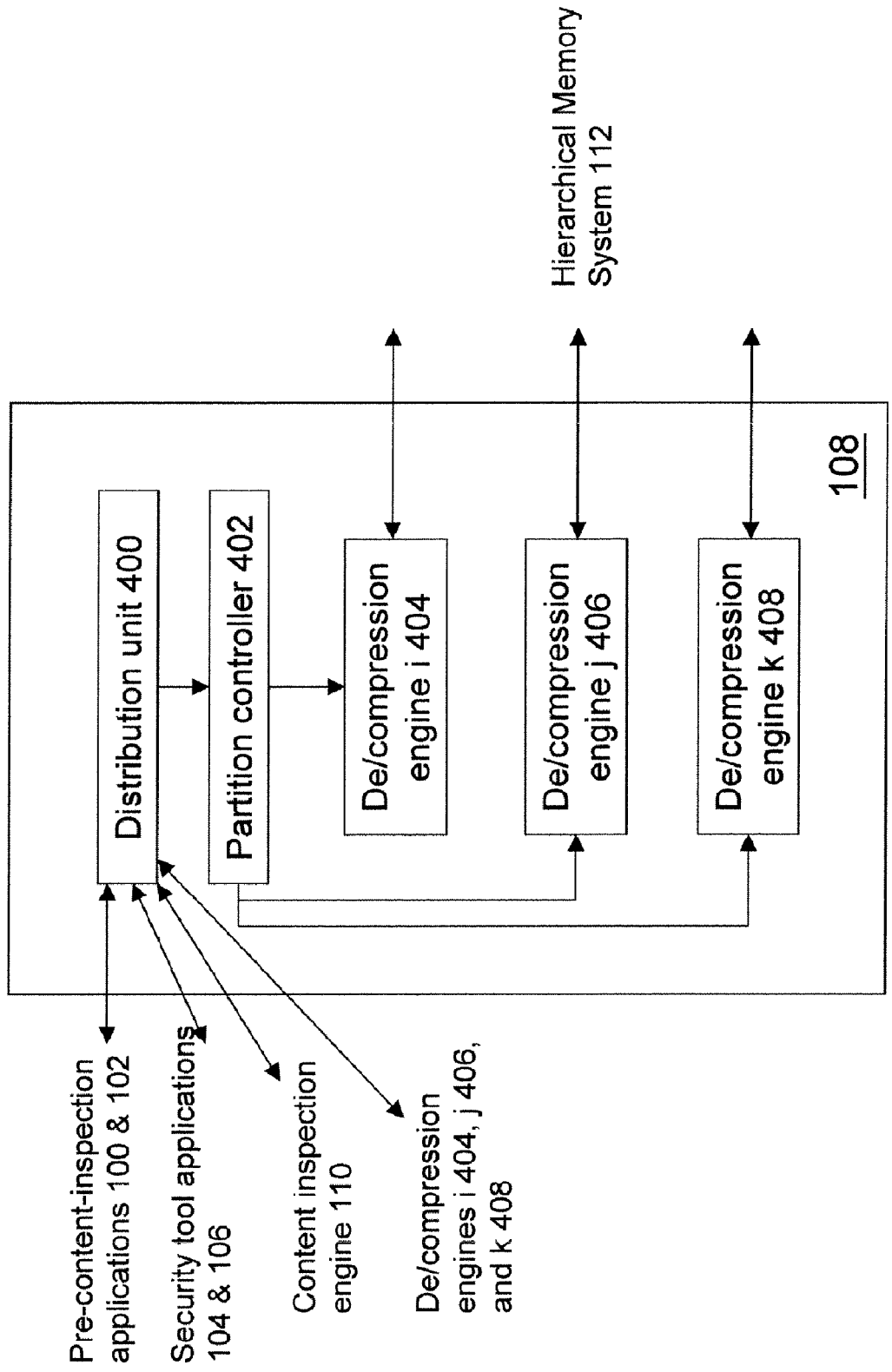
FIG. 4 is a block diagram of one embodiment of a dispatch engine.

FIG. 4 is a block diagram of one embodiment of a dispatch engine, such as dispatch engine 108 as shown in FIG. 1. Specifically, the dispatch engine includes 1) distribution unit 400, 2) partition controller 402, and 3) one or more de/compression engines such as i 404, j 406, and k 408.

One embodiment of distribution unit 400 is mainly responsible for parsing the data units that dispatch engine 108 receives, retrieving the appropriate information from the data units or even initiating certain processes based on the retrieved information, and forwarding the data units to their next destinations. Some possible destinations include partition controller 402, de/compression engines i 404, j 406, and k 408, and content inspection engine 110. Some of the information distribution unit 400 passes on to partition controller 402 includes, without limitation, 1) the size of the portion of the state automata generated from a definition data file, 2) the virtual addresses of the particular memory locations in the memory tier to store the portion of the state automata, and 3) the selected de/compression method for the memory tier.

Partition controller 402 is mainly responsible for mapping the aforementioned virtual addresses into physical memory locations in hierarchical memory system 112 and configuring the de/compression engines, such as i 404, j 406, and k 408. Alternatively, rather than passing on the selected de/compression method to partition controller 402, one embodiment of distribution unit 400 passes the selection information to the de/compression engines directly.

In one implementation, each of de/compression engines i 404, j 406, and k 408 supports a number of de/compression methods that pre-content-inspection application 102 can select from as discussed above. Each de/compression method generally compresses the relevant information in the state automata before storing it in a particular memory tier in hierarchical memory system 112 and decompresses the information after having retrieved it from the memory tier in hierarchical memory system 112. For example, de/compression engines i 404 may compress the data to be stored in memory tier i 306 based on a 3:1 compression ratio, and de/compression engines j 406 and k 408 instead compress based on 5:1 and 8:1 compression ratios, respectively.

Alternatively, it should be apparent to a person of ordinary skill in the art to use a single de/compression engine, as opposed to multiple engines, to compress or decompress data from different memory tiers. In yet another alternative embodiment, de/compression engines i 404, j 406, and k 408 can be parts of hierarchical memory system 112 as opposed to being parts of dispatch engine 108.

2.4. Initialization of the Dispatch Engine

Figure 5:
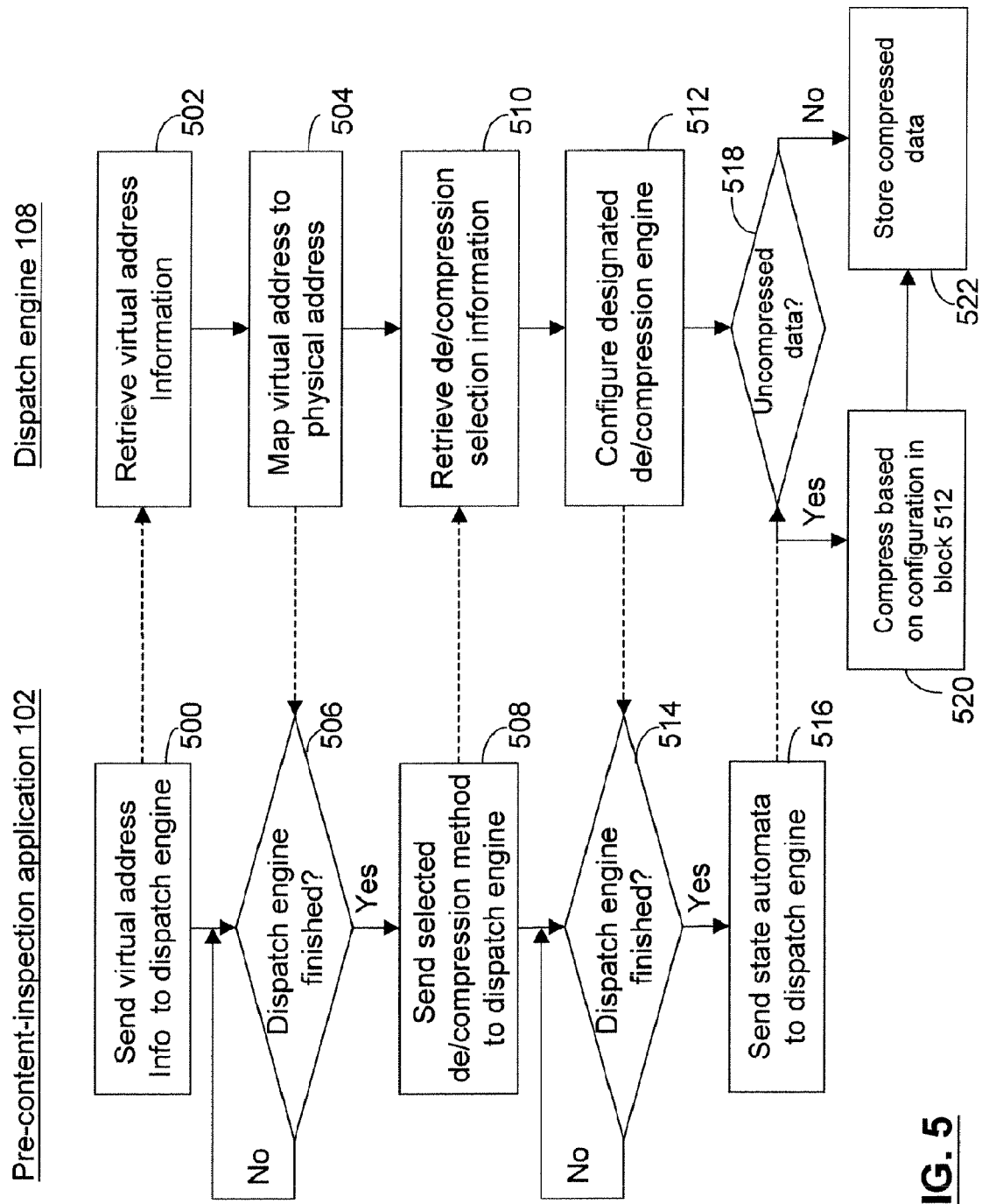
FIG. 5 is a flow chart of one initialization process that one embodiment of a pre-content-inspection application and one embodiment of a dispatch engine follow to interact with one another.

FIG. 5 is a flow chart of one initialization process that one embodiment of pre-content-inspection application 102 and one embodiment of dispatch engine 108 follow to interact with one another. Specifically, one embodiment of pre-content-inspection application 102, or the pattern analysis tool, has access to the virtual address spectrum of each tier of hierarchical memory system 112 to store or retrieve from various parts of the state automata generated by pre-content-inspection application 100 as discussed above. In one implementation, pre-content-inspection application 102 generates and maintains these various virtual address spectra based on, without limitation, the number of memory tiers that hierarchical memory system 112 supports, the memory capacity of each memory tier, and the size of the data to be stored in each memory tier.

In block 500, pre-content-inspection application 102 sends the next available virtual address in each virtual address spectrum to dispatch engine 108 using data units. Distribution unit 400 as shown in FIG. 4 of one embodiment of dispatch engine 108 retrieves the virtual address information from the data units in block 502 and forwards the retrieved information to partition controller 402 for the controller to map to the next available physical address of a memory tier in hierarchical memory system 112 in block 504. Pre-content-inspection application 102 waits for an acknowledgment from dispatch engine 108 in block 506 before placing the selected de/compression method for the memory tier in data units to transmit to dispatch engine 108 in block 508. Distribution unit 400 retrieves the de/compression selection information from the data units in block 510 and configures the designated de/compression engine with the mapped physical address information and the selected method in block 512. As mentioned above, each de/compression engine supports a number of de/compression methods and will perform relevant initialization and set up routines corresponding to the selected method.

Similar to block 506, pre-content-inspection application 102 also waits for a configuration completion acknowledgment from dispatch engine 108 in block 514.

In block 516, pre-content-inspection application 102 sends the state automata to dispatch engine 108 using data units, where distribution unit 400 of dispatch engine 108 retrieves the state automata information from the data units and checks whether the information has been compressed in block 518. If the state automata have not been compressed, based on the configuration performed in block 512, distribution unit 400 forwards the state automata information to one of the de/compression engines to compress in block 520. In block 522, the designated de/compression engine causes the compressed data to be stored in the physical memory locations of the corresponding memory tier in hierarchical memory system 112.

In the process shown in FIG. 5, pre-content-inspection application 102 sends different information to dispatch engine 108 using different data units and at different times. For example, pre-content-inspection application 102 sends state automata in block 516, the selected de/compression method in block 508, and the virtual address information in block 500. Alternatively, various combinations of information could be transmitted at the same time, such as, without limitation, the selected de/compression method and the virtual address information.

2.5. Operation of Content Inspection

Figure 6:
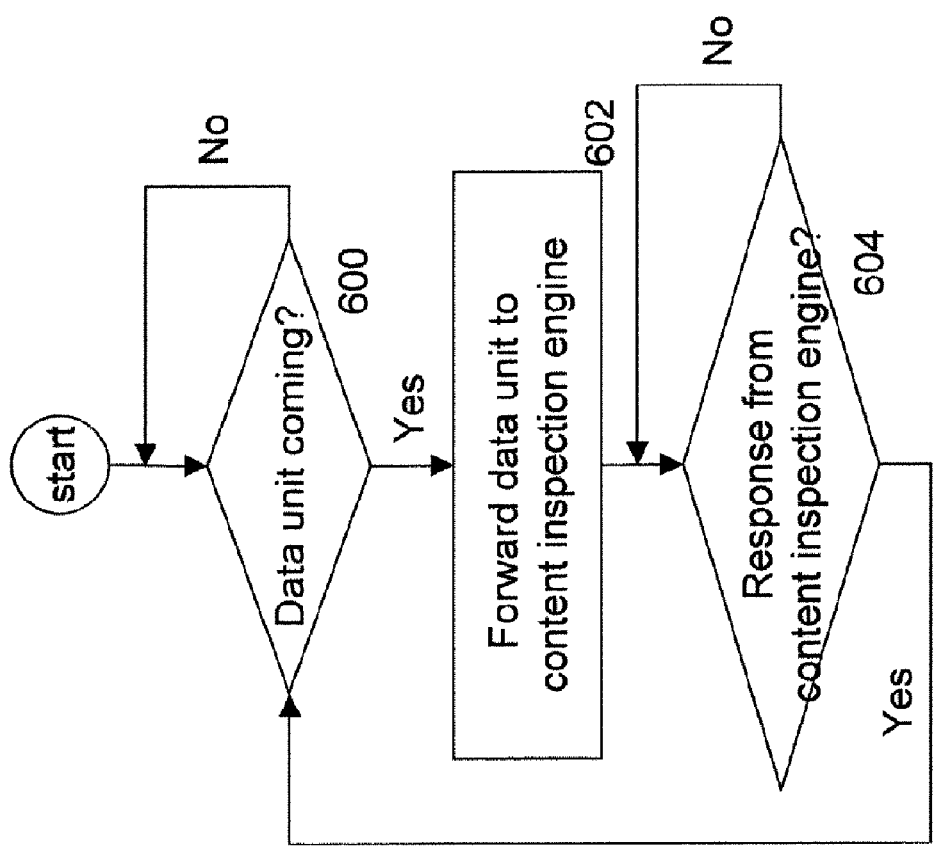
FIG. 6 is a flow chart of one process that one embodiment of a security tool application follows after the inspection of the content of the data units starts begins.

FIG. 6 is a flow chart of one process that one embodiment of a security tool application, such as 104 or 106, follows after the inspection of the content of the data units begins. Specifically, after a data unit is received in block 600, security tool application 104 forward the data unit to content inspection engine 110 in block 602. In an alternative implementation, security tool application 104 forwards the data unit to dispatch engine 108. Dispatch engine 108 determines the memory tier and the physical memory locations in hierarchical memory system 112 to store the data unit and initiates the storage of the data unit in hierarchical memory system 112 for content inspection 110 to subsequently retrieve and process.

One embodiment of security tool application 104 also waits for a response from content inspection engine 110 in block 604 before looking for the next data unit. For example, content inspection engine 110 may indicate that it has operated on all the processing elements of the data unit or whether it has identified an unwanted pattern. Alternatively, another embodiment of security tool application 104 forwards the data units to content inspection engine 110 or dispatch engine 108 without waiting any responses.

Figure 7:
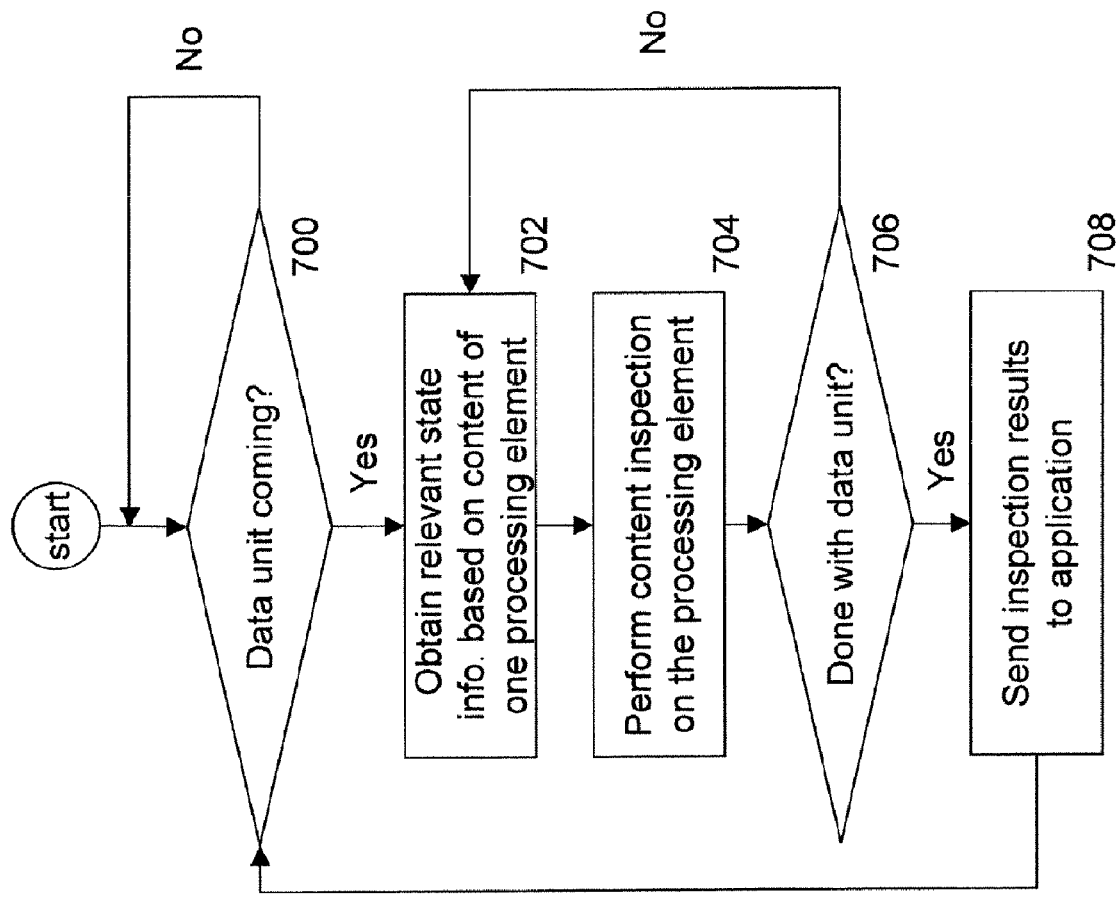
FIG. 7 is a flow chart of one process that one embodiment of a content inspection engine follows to inspect the content of the data units.

FIG. 7 is a flow chart of one process that one embodiment of content inspection engine 110 follows to inspect the content of the data units. In particular, after content inspection engine 110 receives a data unit from a security tool application, such as 104 or 106, or dispatch engine 108 in block 700, based on the content of the processing element in the data unit, content inspection engine 110 obtains particular state information (e.g., certain states in the state automata and the relevant dependency relationships among the states) from dispatch engine 108 in block 702. For example, if one embodiment of content inspection engine 110 supports byte-wise processing, then the processing element is a byte.

In block 704, content inspection engine 110 compares the content of the processing element with the state information obtained in block 702. The process continues until all the processing elements in the data unit have been analyzed in block 706. As an illustration, if the data unit contains 80 bytes of content and if the processing element is a byte, then the process of blocks 702, 704, and 706 will repeat 80 times. Then content inspection engine 110 sends the inspection results back to security tool application 104 in block 708 and waits for the next data unit.

Figure 8:
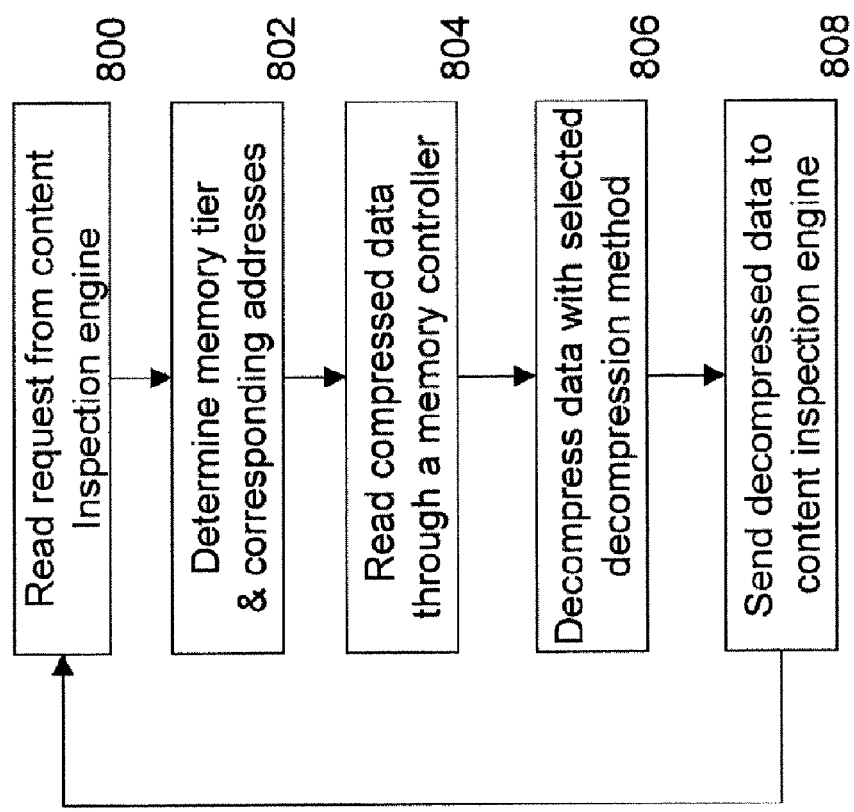
FIG. 8 is a flow chart of one process that one embodiment of a dispatch engine follows after the inspection of the content of the data units begins.

FIG. 8 is a flow chart of one process that one embodiment of dispatch engine 108 follows after the inspection of the content of the data units begins. Specifically, after having received a request to access certain portions of the state automata from content inspection engine 110 in block 800, partition controller 402 of dispatch engine 108 as shown in FIG. 4 determines the memory tier and the corresponding physical addresses where the requested portions are stored in block 802. The de/compression engine that corresponds to the memory tier in dispatch engine 108 receives the stored data via one of the memory controllers in hierarchical memory system 112 in block 804 and decompresses the received data in block 806 using the decompression method selected during the aforementioned initialization process. In block 808, dispatch engine 108 sends the decompressed state information to content inspection engine 110 and waits for the next request.

3.0 Example System Structure

Figure 9:
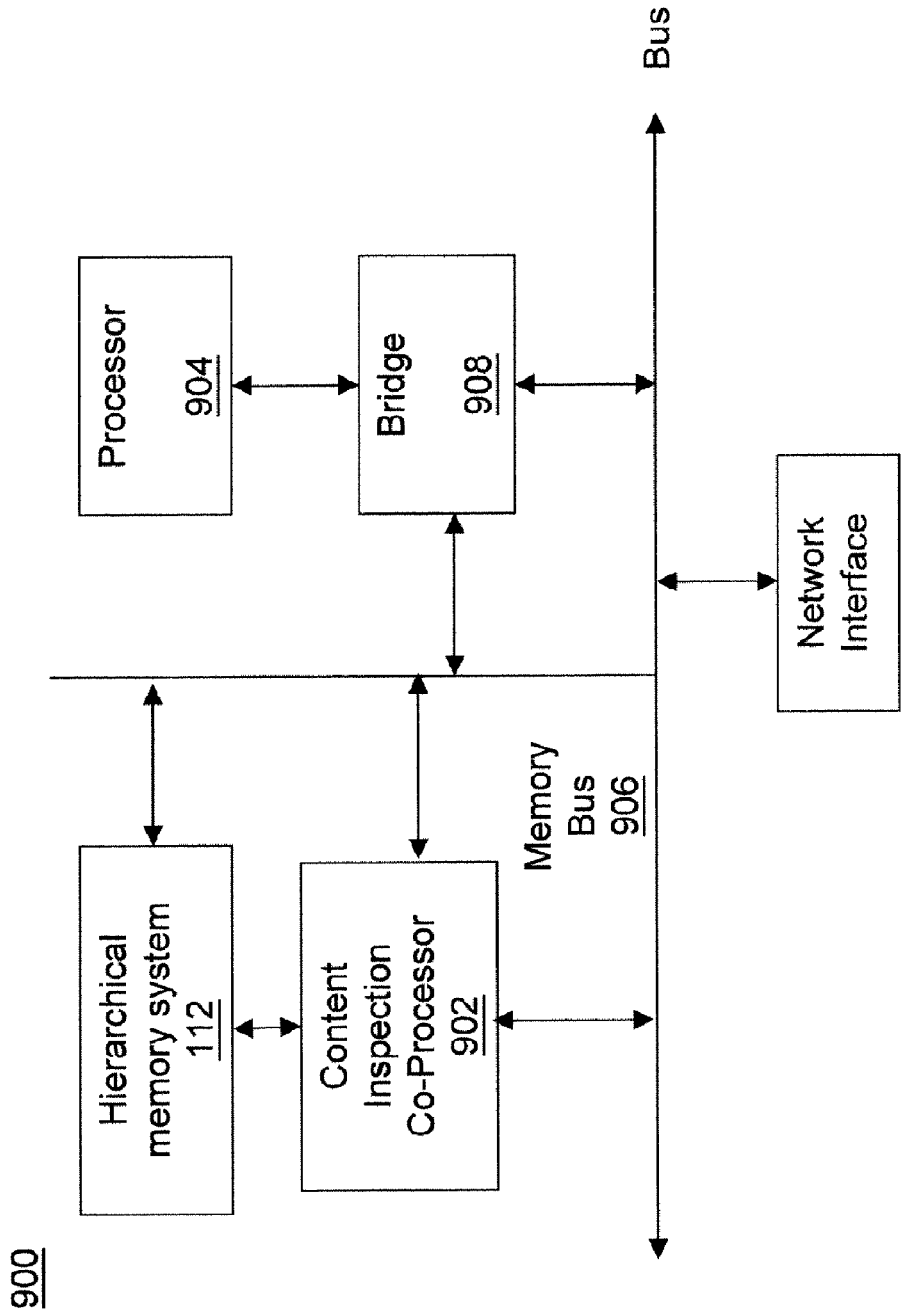
FIG. 9 is a block diagram of a system upon which an embodiment of the system security approaches may be implemented.

FIG. 9 is a block diagram that illustrates a system 900 upon which an embodiment of the system security approaches may be implemented. Specifically, system 900 includes a processor 904, which performs the operations of the pre-content-inspection and security tool applications, and content inspection co-processor ("CICP") 902, which performs the content inspection tasks. One embodiment of CICP 902 includes dispatch engine 108 and content inspection engine 110 as shown in FIG. 1. Alternatively, CICP 902 may also include the memory controllers as shown in FIG. 3.

Figure 10:
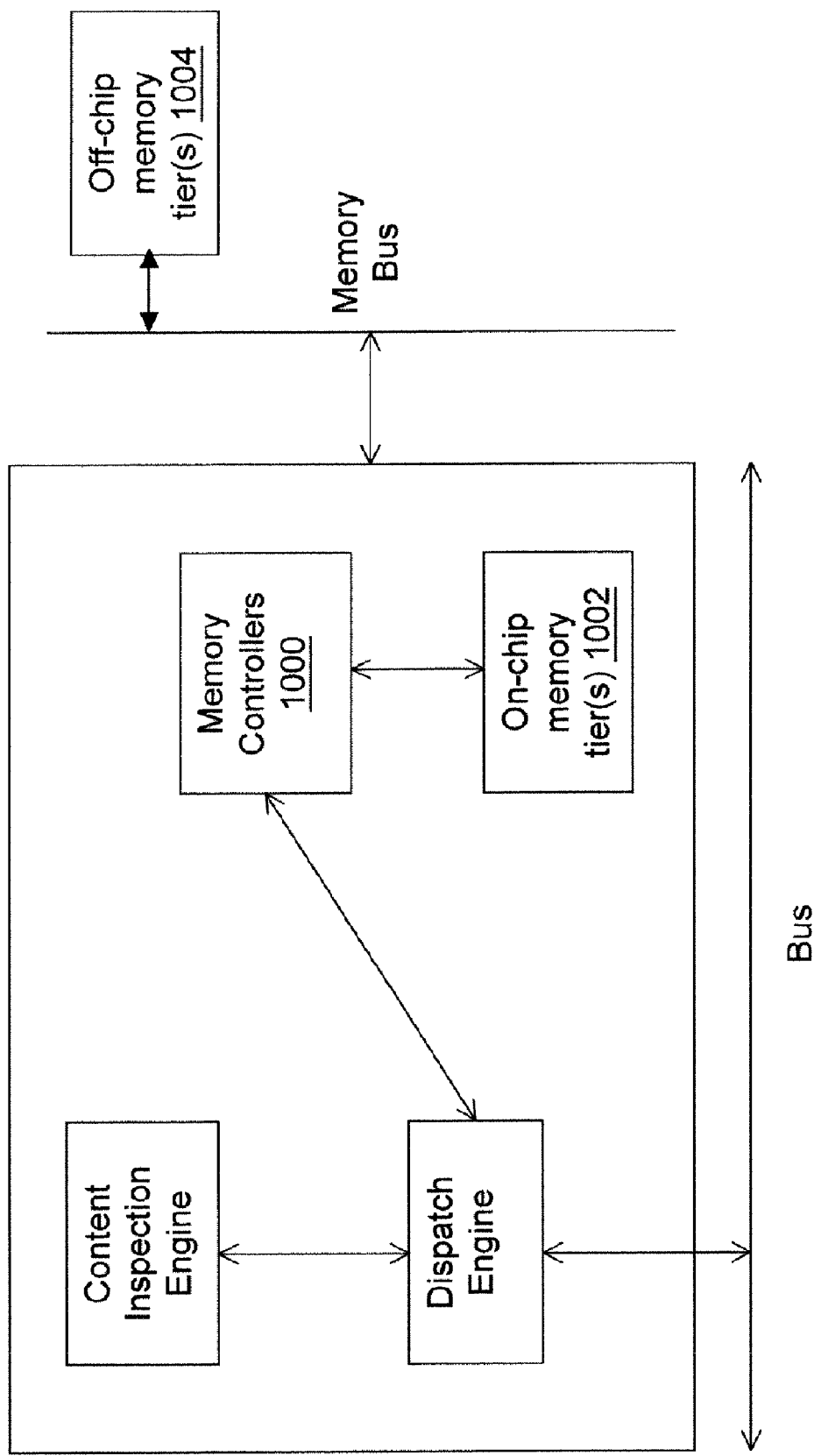
FIG. 10 is a block diagram of an embodiment of a content inspection engine as a co-processor.

FIG. 10 is a block diagram of an embodiment of the CICP discussed above. In this embodiment, hierarchical memory system 112 of FIG. 1 is divided into memory controllers 1000, on-chip memory tier(s) 1002, and off-chip memory tier(s) 1004. Specifically, memory controllers 1000 correspond to the controllers such as memory controller i 300, j 302, and k 304 as shown in FIG. 3. On-chip memory tier(s) 1002 may correspond to memory tier i 306 and j 308. Off-chip memory tier(s) 1004 may correspond to memory tier k 310.

CICP can be implemented as an application-specific integrated circuit ("ASIC"), programmed in a programmable logic device, or even as a functional unit in a system-on-chip ("SOC"). In one implementation, CICP 902 communicates with processor 904 via bridge 908 and memory bus 906. Alternatively, CICP 902 can communicate directly with processor 904 (this direction communication channel is not shown in FIG. 9), if processor 904 provides appropriate interfaces for such communication.

Processor 904 can either be a general purpose processor or a specific purpose processor. Some examples of a specific purpose processor are processors that are designed for, without limitation, data communications, signal processing, mobile computing, and multimedia related applications. Specific purpose processors often include interfaces that other external units can directly connect. For instance, such a specific purpose processor may include one or more memory interfaces that either various types of memories can connect to or a co-processing unit, such as CICP 902, can connect to.

One or more of the components illustrated in FIG. 9 can be added (e.g., display device), combined (e.g., CICP 902 and processor 904 can reside on one SOC), or further divided (e.g., bridge 908 can be further divided into a processor bridge, a bus controller, and a memory controller) and still remain within the claimed scope of the system security approaches.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for monitoring a plurality of data units, comprising:

based on the content of said plurality of said data units, retrieving a plurality of states and dependency relationships among said plurality of said states that correspond to a plurality of unwanted patterns from a hierarchical memory system, wherein said plurality of said states and said dependency relationships are placed in a plurality of memory types in said hierarchical memory system according to a frequency of accessing said plurality of said states, which is calculated by comparing a plurality of test data patterns with said plurality of said states in a sequence specified by said dependency relationships; and identifying a set of suspected data units by comparing said plurality of said data units with said plurality of said states in said sequence specified by said dependency relationships, wherein the content of said set of said suspected data units collectively matches any of said plurality of said unwanted patterns.

2. The method as recited in claim 1, further comprising:
selecting from said plurality of said memory types at least one memory tier with a plurality of corresponding virtual addresses to store said plurality of said states and said dependency relationships.

3. The method as recited in claim 2, further comprising:
mapping said plurality of said corresponding virtual addresses to a plurality of physical memory addresses; and
retrieving said plurality of said states and said dependency relationships from said plurality of said physical memory addresses.

4. The method as recited in claim 1, further comprising:
decompressing said plurality of said states and said dependency relationships, which are retrieved from said plurality of said memory types and have been compressed, prior to identifying said set of said suspected data units.

5. The method as recited in claim 4, further comprising:
selecting a decompression method based on the content of said plurality of said data units.

6. The method as recited in claim 1, wherein each of said plurality of said memory types in said hierarchical memory system has a distinctive memory access time.

7. The method as recited in claim 1, wherein each of said plurality of said data units contains at least one processing element.

8. A system for monitoring a plurality of data units, comprising:

a dispatch means for, based on the content of said plurality of said data units, retrieving a plurality of states and dependency relationships among said plurality of said states that correspond to a plurality of unwanted patterns from a hierarchical memory system, wherein said plurality of said states and said dependency relationships are placed in a plurality of memory types in said hierarchical memory system according to a frequency of accessing said plurality of said states, which is calculated by comparing a plurality of test data patterns with said plurality of said states in a sequence specified by said dependency relationships; and a content inspection means for identifying a set of suspected data units by comparing said plurality of said data units with said plurality of said states in said sequence specified by said dependency relationships, wherein the content of said set of said suspected data units collectively matches any of said plurality of said unwanted patterns.

9. The system as recited in claim 8, further comprising:
means for selecting from said plurality of said memory types at least one memory tier with a plurality of corresponding virtual addresses to store said plurality of said states and said dependency relationships.

10. The system as recited in claim 9, further comprising:
means for mapping said plurality of said corresponding virtual addresses to a plurality of physical memory addresses; and
means for retrieving said plurality of said states and said dependency relationships from said plurality of said physical memory addresses.

11. The system as recited in claim 8, further comprising:
means for decompressing said plurality of said states and said dependency relationships, which are retrieved from said plurality of said memory types and have been compressed, prior to identifying said set of said suspected data units.

12. The system as recited in claim 11, wherein said dispatch means further selects a decompression method based on the content of said plurality of said data units.

13. The system as recited in claim 8, wherein each of said plurality of said memory types in said hierarchical memory system has a distinctive memory access time.

14. The system as recited in claim 8, wherein each of said plurality of said data units contains at least one processing element, which is supported by said content inspection means.

15. A system for monitoring a plurality of data units, comprising:

a dispatch engine;

a hierarchical memory system;

a content inspection engine, coupled to said distribution engine and said hierarchical memory system, wherein:

said dispatch engine, based on the content of said plurality of said data units, retrieves a plurality of states and dependency relationships among said plurality of said states that correspond to a plurality of unwanted patterns from said hierarchical memory system, wherein said dispatch engine has caused the distribution of said plurality of said states and said dependency relationships among a plurality of memory types in said hierarchical memory system according to a frequency of accessing said plurality of said states calculated by an application, which compares a plurality of test data patterns with said plurality of said states in a sequence specified by said dependency relationships; and said content inspection engine identifies a set of suspected data units by comparing said plurality of said data units with said plurality of said states in said sequence specified by said dependency relationships, wherein the content of said set of said suspected data units collectively matches any of said plurality of said unwanted patterns.

16. The system as recited in claim 15, wherein said dispatch engine further comprising:
a partition controller to select from said plurality of said memory types at least one memory tier with a plurality of corresponding virtual addresses to store said plurality of said states and said dependency relationships.

17. The system as recited in claim 16, wherein said partition controller maps said plurality of said corresponding virtual addresses to a plurality of physical memory addresses.

18. The system as recited in claim 15, wherein said dispatch engine further comprising:
a plurality of decompression engines that decompress said plurality of said states and said dependency relationships, which are retrieved from said plurality of said memory types and have been compressed, prior to identifying said set of said suspected data units.

19. The system as recited in claim 18, wherein said dispatch engine further:
selects a decompression method based on the content of said plurality of said data units.

20. The system as recited in claim 15, wherein each of said plurality of said memory types in said hierarchical memory system has a distinctive memory access time.

21. The system as recited in claim 15, wherein each of said plurality of said data units contains at least one processing element, which is supported by said content inspection engine.

22. A system for monitoring a plurality of data units, comprising:
a bus;
a processor, coupled to said bus;
a hierarchical memory system, coupled to said bus; and
a content inspection co-processor coupled to said bus and to said hierarchical memory system, wherein said content inspection co-processor further comprising:
a dispatch engine;
a content inspection engine, coupled to said distribution engine, wherein:
said dispatch engine, based on the content of said plurality of said data units, retrieves a plurality of states and dependency relationships among said plurality of said states from said hierarchical memory system, which collectively represent a plurality of unwanted patterns, wherein said plurality of said states and said dependency relationships were distributed among a plurality of memory types in said hierarchical memory system by said dispatch engine according to a frequency of accessing said plurality of said states calculated by an application, which when executed upon said processor, compares a plurality of test data patterns with said plurality of said states in a sequence specified by said dependency relationships;
and
said content inspection engine identifies a set of suspected data units by comparing said plurality of said data units with said plurality of said states in said sequence specified by said dependency relationships, wherein the content of said set of said suspected data units collectively matches any of said plurality of said unwanted patterns.

23. The system as recited in claim 22, wherein said dispatch engine further comprising:
a partition controller to select from said plurality of said memory types at least one memory tier with a plurality of corresponding virtual addresses to store said plurality of said states and said dependency relationships are stored.

24. The system as recited in claim 23, wherein said partition controller maps said plurality of said corresponding virtual addresses to a plurality of physical memory addresses.

25. The system as recited in claim 22, wherein said dispatch engine further comprising:
a plurality of decompression engines that decompress said plurality of said states and said dependency relationships, which are retrieved from said plurality of said memory types and have been compressed, prior to identifying said set of said suspected data units.

26. The system as recited in claim 25, wherein said dispatch engine further selects a decompression method based on the content of said plurality of said data units.

27. The system as recited in claim 22, wherein each of said plurality of said memory types in said hierarchical memory system has a distinctive memory access time.

28. The system as recited in claim 22, wherein each of said plurality of said data units contains at least one processing element, which is supported by said content inspection co-processor.

* * * * *